(12) United States Patent
Tang (10) Patent No.: US 7,673,236 B2
(45) Date of Patent: Mar. 2, 2010

(54) METHOD OF INPUTTING TEXT INTO A DATA PROCESSING APPARATUS

(75) Inventor: Wai Choi Tang, Hong Kong (HK)

(73) Assignee: LX1 Technology Limited, Kowloon (HK)

( * ) Notice: Subject to any disclaimer, the term of this patent is extended or adjusted under 35 U.S.C. 154(b) by 1636 days.

(21) Appl. No.: 10/067,834

(22) Filed: Feb. 8, 2002

(65) Prior Publication Data

US 2002/0138292 A1 Sep. 26, 2002

(30) Foreign Application Priority Data

Feb. 9, 2001 (HK) ............................... 01100950.7

(51) Int. Cl.
*G06F 17/21* (2006.01)
(52) U.S. Cl. ...................... 715/256; 715/273; 715/277; 715/764; 715/775; 715/783; 707/4; 707/102
(58) Field of Classification Search ................ 715/514, 715/530, 712, 713, 764, 775, 783, 255, 256, 715/273, 277; 707/4, 102
See application file for complete search history.

(56) References Cited

U.S. PATENT DOCUMENTS

| | | | |
|---|---|---|---|
| 5,404,506 A * | 4/1995 | Fujisawa et al. ............... | 707/4 |
| 5,555,408 A * | 9/1996 | Fujisawa et al. ............... | 707/5 |
| 5,664,109 A | 9/1997 | Johnson et al. | |
| 6,208,339 B1 * | 3/2001 | Atlas et al. .................. | 715/780 |
| 6,393,430 B1 * | 5/2002 | Van Ryzin ............... | 707/104.1 |
| 6,446,080 B1 * | 9/2002 | Van Ryzin et al. ....... | 707/104.1 |

(Continued)

FOREIGN PATENT DOCUMENTS

JP 07-271774 10/1995

(Continued)

OTHER PUBLICATIONS

Pfaffenberger et al., "Microsoft Windows 98 and the Internet," 1999, Microsoft Press, pp. 617-618.*

*Primary Examiner*—Joshua D Campbell
(74) *Attorney, Agent, or Firm*—Buchanan Ingersoll & Rooney PC (57) ABSTRACT

There is disclosed a method of inputting text into a data processing apparatus, including the steps of (a) providing a database of words arranged hierarchically into a plurality of levels; (b) displaying at least one window on a visual display unit of said data processing apparatus; (c) showing a plurality of said words in said at least one window; (d) choosing a word or words from said plurality of words shown in said at least one window; and (e) outputting an output in response to choosing of said word(s) in said step (d). There is also disclosed a computer program configured and executable, when installed in a data processing apparatus, to (a) provide in said data processing apparatus a database of words arranged hierarchically into a plurality of levels, (b) display at least one window on a visual display unit of said data processing apparatus, (c) show a plurality of said words in said at least one window, (d) choose a word or words from said plurality of words shown in said at least one window; and (e) output an output in response to choosing of said word(s) in (d) above.

28 Claims, 9 Drawing Sheets

```
.Action\Activity\Find
.Action\Activity\Go
.Action\Commercial\Buy
.Action\Commercial\Sell
```

```
Subject\I
.Action\Activity\Go
.Supermarket\Woolworld
.Action\Commercial\Buy
```

U.S. PATENT DOCUMENTS 6,484,149 B1 * 11/2002 Jammes et al. ................ 705/26
6,760,721 B1 * 7/2004 Chasen et al. .................. 707/3

FOREIGN PATENT DOCUMENTS

| | | |
|---|---|---|
| JP | 09-212503 | 8/1997 |
| JP | 09-274613 | 10/1997 |
| JP | 09-288666 | 11/1997 |
| JP | 10-154156 | 6/1998 |
| JP | 2000-137729 | 5/2000 |

* cited by examiner

Subject\He
Subject\I
Subject\She
Subject\They

Subject\I

Fig. 1

.Action\Activity\Come
.Action\Activity\Find
.Action\Activity\Go
.Action\CommercialBuy Subject\I
.Action\Activity\Go

Fig. 2

.Price\HK$\0015
.Price\HK$\0020
.Supermarket\Woolworld
.Supermarket\Yole

Subject\I
.Action\Activity\Go
.Supermarket\Woolworld

Fig. 3

.Action\Activity\Find
.Action\Activity\Go
.Action\Commercial \Buy
.Action\Commercial\Sell Subject\I
.Action\Activity\Go
.Supermarket\Woolworld
.Action\Commercial\Buy

Fig. 4

.Action\Commercial \Sell
.Food\Animal\Egg\Bird
.Food\Animal\Egg\Hen
.Made\Country\Australia Subject\I
.Action\Activity\Go
.Supermarket\Woolworld
.Action\Commercial\Buy
.Food\Animal\Egg\Hen

Fig. 5

.Number\006
.Price\kg\USD\001.0
.Price\kg\USD\002.0
.Price\kg\USD\003.0

Subject\I
.Action\Activity\Go
.Supermarket\Woolworld
.Action\Commercial\Buy
.Food\Animal\Egg\Hen
.Price\kg\USD\001.0

Fig. 6

.Number\003
.Number\004
.Number\005
.Number\006

Subject\I
.Action\Activity\Go
.Supermarket\Woolworld
.Action\Commercial\Buy
.Food\Animal\Egg\Hen
.Price\kg\USD\001.0
.Number\006

METHOD OF INPUTTING TEXT INTO A DATA PROCESSING APPARATUS

This invention relates to a method of inputting text into a data processing apparatus, e.g. a personal computer or a personal digital assistant, and in particular such a method in which words are inputted into the data processing apparatus in a logical way from a database.

BACKGROUND OF THE INVENTION

Various methods have been devised for inputting text into a data processing apparatus. However, in most such methods, each word, phrase or sentence has to be inputted, by typing, afresh every time it is required. As more and more words, phrases or sentences are inputted, more spelling mistakes will occur. In addition, although there are ways of locating all occurrences of the same word, phrase or sentence in a document file in a data processing apparatus, e.g. a computer, all such occurrences of the word, phrase or sentence are located in isolation, i.e. out of the context in which such are located.

It is thus an object of the present invention to provide a method of inputting text into such an apparatus in which the aforesaid shortcomings are mitigated, or at least to provide a useful alternative to the public.

SUMMARY OF THE INVENTION

According to a first aspect of the present invention, there is provided a method of inputting text into a data processing apparatus, including the steps of (a) providing a database of words arranged hierarchically into a plurality of levels; (b) displaying at least one window on a visual display unit of said data processing apparatus; (c) showing a plurality of said words in said at least one window; (d) choosing a word or words from said plurality of words shown in said at least one window; and (e) outputting an output in response to choosing of said word(s) in said step (d).

According to a second aspect of the present invention, there is provided a computer program configured and executable, when installed in a data processing apparatus, to (a) provide in said data processing apparatus a database of words arranged hierarchically into a plurality of levels, (b) display at least one window on a visual display unit of said data processing apparatus, (c) show a plurality of said words in said at least one window, (d) choose a word or words from said plurality of words shown in said at least one window; and (e) output an output in response to choosing of said word(s) in (d) above.

The present invention is based on the realization that all human languages have a common basic structure. For example, for each topic, there is at least a topic description. Such topic descriptions relate to:

| Colour | Number | Length | Height | Weight | Diameter |
|--------|--------|--------|--------|--------|----------|
| Width | Depth | Frequency | Unit (kg) | Unit (cm) | Unit (km) |
| Amount | Extent | Place | Person | Activity | Time |
| Date | Month | Year | Speed | Price | |

Severity: mild, moderate, severe

The present invention is also based on a hierarchical arrangement of the topic descriptions. For example, in the following example, a "." is used for indicating a sub-level:

EXAMPLE 1

Cough
.Day\01
.Day\02
.Day\03
.Day\04

In the above Example 1, assuming that a doctor asks a patient for how long the patient has been coughing, the patient may then reply by saying one day, two days, etc. The doctor may simply go down one level from "Cough" to the day descriptors, which include "Day\01", "Day\02", etc. Another possible level immediately below "Cough" may be the severity of coughing, as in the following Example:

EXAMPLE 2

Cough
.Severity\mild
.Severity\moderate
.Severity\Severe

More complicated versions of the hierarchical arrangement of the levels of topic descriptors are shown below in Examples 3 and 4:

EXAMPLE 3

Orange
.Amount
..Number
...0.001
...0.002
...0.003
...0.004
..Box
...0.001
...0.002
...0.003
.Colour
..Blue
..Red
..Orange
..Green
..White
..Black
.Sweetness
..Sweet
..Sour
..Bitter

EXAMPLE 4

Transportation
.Car
..Truck
..Lorry
..Van
..Sedan
...Brand\A
...Brand\B
...Brand\C
.Ship
.Bicycle .Aeroplane
.Plane
.Fighter This invention is also based on the realization that some words may be grouped into a common category in accordance with the significance and/or meaning of the words. For example, "cars", "ships" and "aeroplanes" are all means of transportation, and may thus be grouped under the common category of "transportation". On the other hand, "pigs", "cows" and "goats" may all be grouped under the common category of "animals". Of course, in order to be more specific, "pigs", "cows" and "goats" may be classified under the common category of "animals.vertebrates". This may be termed a "common root" feature of the words.

In this way, a hierarchically arranged database or central library with topic descriptors arranged into various levels may then be constructed on the basis of the common language structure and common root feature discussed above. It can also be seen that under each level, there may be more than one immediate sub-level. As in the case of the level "Amount" in Example 3, there are two immediate sub-levels, namely "Number" and "Box".

Such a database and the relevant software may be stored in an optically readable data disc, e.g. a compact disc, or other data carrier media, which may then be transferred to and installed in a hard disc of a computer or other data processing apparatus for future use. Alternatively, it is also possible to download the relevant program into the data processing apparatus from a computer network, e.g. the Internet.

The database or central library may be tailored made for the specific user. It is generally known that, while most people have a common stock of vocabulary, different professions or trades have their own respective vocabulary, which are seldom used by other professions or trades. For example, lawyers have some terms or vocabulary which are very seldom, if ever, used by a doctor or an architect. Different versions of the database may thus be provided, each tailored made for a specific profession or trade, or a specific range of professions or trades.

BRIEF DESCRIPTION OF THE DRAWINGS

An embodiment of the invention will now be more specifically described below and with reference to the accompanying drawings, in which.

DETAILED DESCRIPTION OF THE PREFERRED EMBODIMENTS

As a first example, the following sentence is to be inputted into the computer:

"I go to Woolworld Supermarket

Buy 6 hen egg which is Sold at USD1/kg"

Conventionally, such a sentence has to be inputted by typing in alphabet after alphabet, and word after word. Errors may be committed in typing the words or numbers. According to the present invention, however, such errors may be avoided, or at least reduced.

A data carrier, e.g. a compact disc, carrying a software according to the present invention is first installed into a memory, e.g. a hard disk, of the data processing apparatus, e.g. a computer, in which the method is to be carried out. Also optionally installable into the memory of the computer is a database of words arranged hierarchically into a plurality of levels. If not installed into the memory of the computer, the database may be accessed via a CD-ROM reader of the computer into which the compact disc carrying the software is received.

Figure 1:
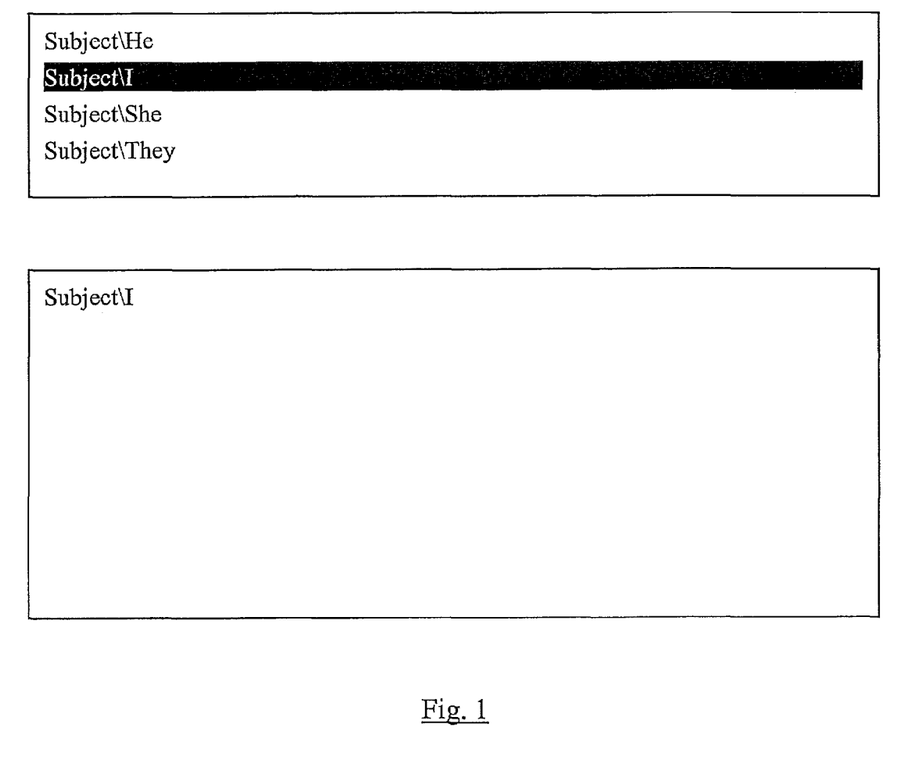
FIG. 1 shows a first display from a visual display unit of a data processing apparatus during use of a method and program according to the present invention.

When a user starts to input the above sentence into the computer, the relevant software will be executed to show a display, part of which is as shown in FIG. 1, on a visual display unit of the computer. The display is generally divided into an upper window 12 and a lower window 14. The relative size of the upper window 12 and the lower window 14 may be varied, in accordance with the preference of the user. In this example, the upper window 12 is smaller than the lower window 14.

In the upper window 12, topic descriptors of various levels may be displayed, though not necessarily at the same time, available for designation and choice. The topic descriptors chosen will be shown in the lower window 14. As in this example, the first top descriptor to be entered is the subject of the sentence, which may be such words as "He", "I", "She", "They" "We", and "You". The possible choices are, in this example, arranged in alphabetical order in the upper window 12. The desired choice, i.e. the word "I" in this example, may then be highlighted by an arrow controllable by a mouse of the computer. In particular, clicking a left button of the mouse when the arrow on the screen is on the line "Subject\I" in the upper window 12 will highlight the line, as shown in FIG. 1. A further click of the left button of the mouse will signify the choosing of this line, and the topic descriptor "Subject\I" will appear in the lower window 14, again as shown in FIG. 1, in a manner to be discussed below.

Alternatively, a quick double-click of the left button of the mouse when the arrow on the screen is on the line "Subject\I" will also signify choosing of this line, whereupon the topic descriptor "Subject\I" will appear in the lower window 14. As a further alternative, a highlight bar may be caused to move upward or downward, by pressing the "↑" and "↓" keys in a keyboard of the computer, from line to line until the required line of topic descriptor is highlighted. An "Enter" key on a keyboard of the computer may then be pressed to signify the choosing of this line of topic descriptor, whereupon the topic descriptor "Subject\l" will appear in the lower window 14. An advantage associated with the use of the "↑" and "↓" keys is that such a method may be used in data processing apparatus of a relatively small size, as only two to three keys are required.

Figure 2:
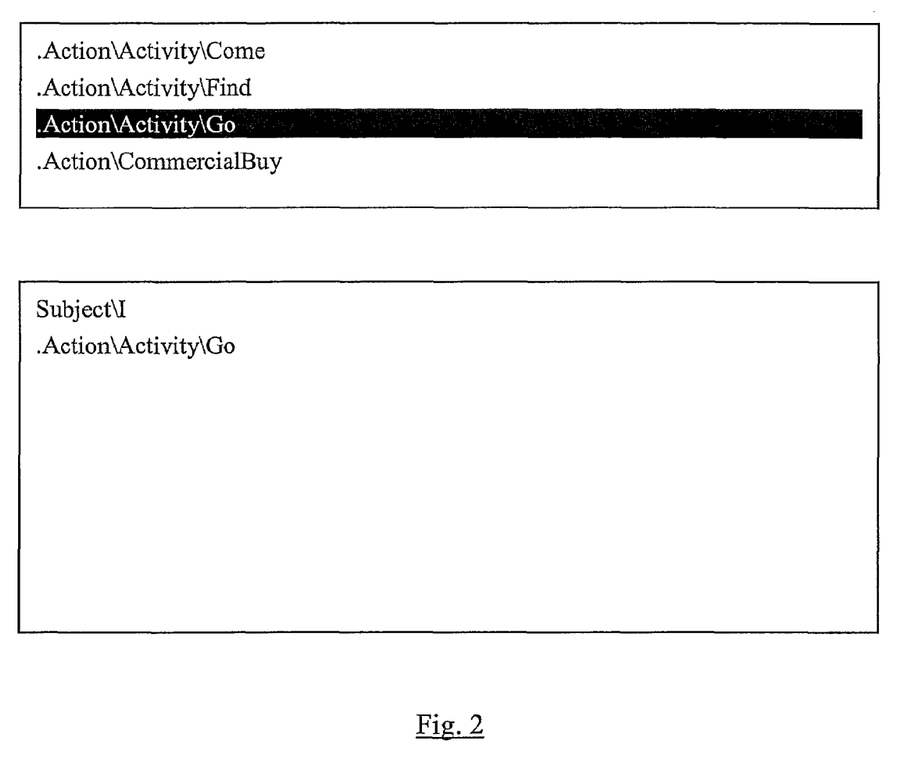
FIG. 2 shows a second display from the visual display unit in FIG. 1 during use of the method and program according to the present invention.

As to the word "go", such is an activity, and is thus grouped under the level "Activity" under the level "Action", as shown in FIG. 2. Under the same level "Activity" are also grouped such words as "Come" and "Find". It can be seen that before the word "Action" in the upper window 12 is a ".", which signifies that such is at a sub-level.

It should also be noted that, once a certain level descriptor is chosen, the immediately below sub-level will be opened by being shown in the upper window 12. Using Example 4 as an example, when the level descriptor ".Car" is chosen, the immediately below sub-level ".Truck", ".Lorry", ".Van", and ".Sedan" will be displayed in the upper window 12 for possible designation and choice. Similarly, when the level descriptor ".Sedan" is chosen, the sub-level immediately below it, namely ".Brand\A", ".Brand\B" and ".Brand\C" will be displayed in the upper window 12 for possible designation and choice, and so on.

Figure 4:
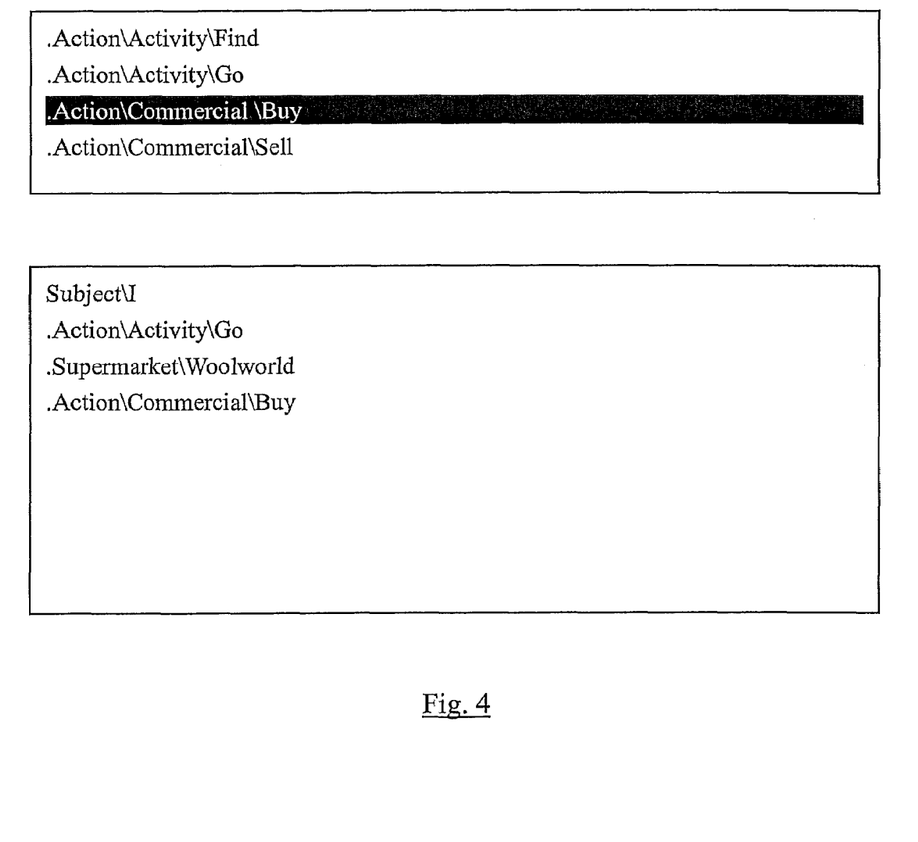
FIG. 4 shows a fourth display from the visual display unit in FIG. 1 during use of the method and program according to the present invention.
Figure 5:
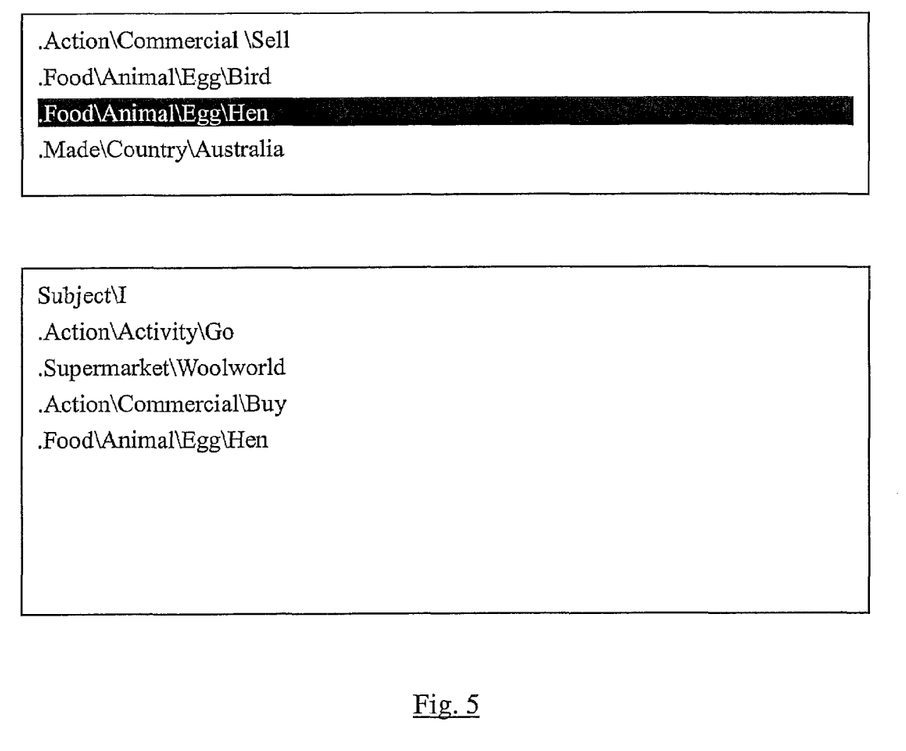
FIG. 5 shows a fifth display from the visual display unit in FIG. 1 during use of the method and program according to the present invention.
Figure 6:
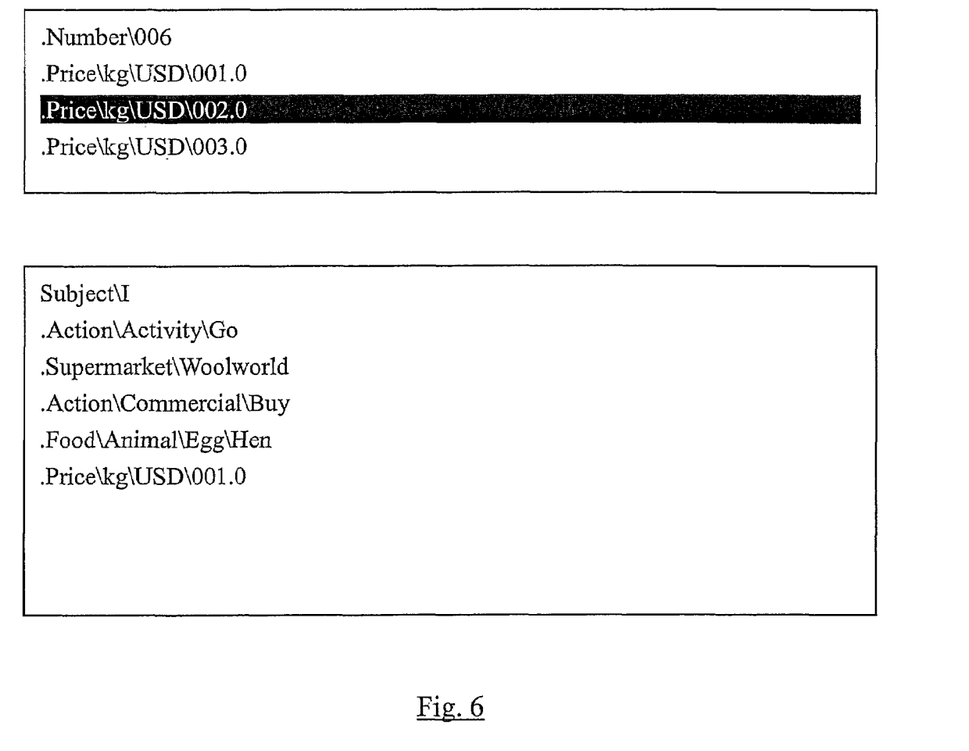
FIG. 6 shows a sixth display from the visual display unit in FIG. 1 during use of the method and program according to the present invention.
Figure 7:
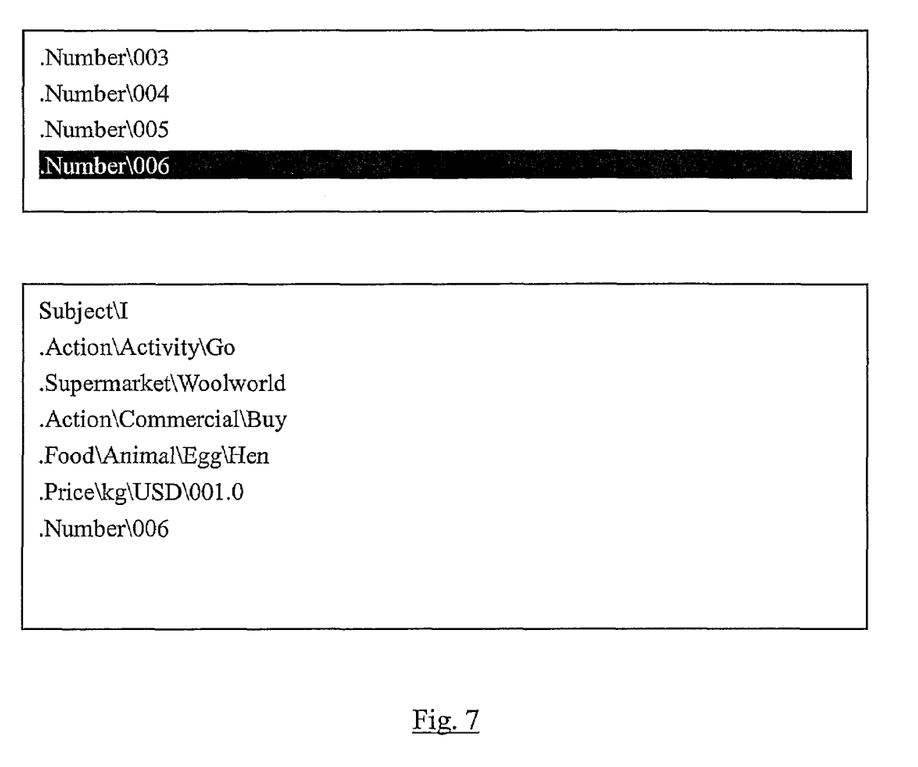
FIG. 7 shows a seventh display from the visual display unit in FIG. 1 during use of the method and program according to the present invention.

Referring back to the present example, further topic descriptors, such as "Supermarket\Woolworld" (see FIG. 3), "Action\Commercial\Buy" (see FIG. 4), "Food\Animal\Egg\Hen" (see FIG. 5), "Price\kg\USD\001.0" (see FIG. 6) and "Number\006" (see FIG. 7) may be inputted in a similar way. When the lower window 14 is in the state as shown in FIG. 7, the user may activate the software in the computer to change it into a sentence in normal human language form, as follows:

"I go to Woolworld Supermarket

Buy 6 hen egg which is Sold at USD1/kg"

It can be seen that, in the entry of the above text, the words are not keyed in as in the conventional manner. There is thus no risk of mis-typing the words. If it is later found that a certain word is mis-spelt in the database, e.g. the word "apple" is mis-spelt as "appel", the user may correct the database, and cause all occurrences of the word "appel" to be corrected to "apple". Thus each word will be inputted into the computer in the same way, i.e. the words are either consistently correct, or consistently wrong. In either case, internal consistency is ensured.

Figure 3:
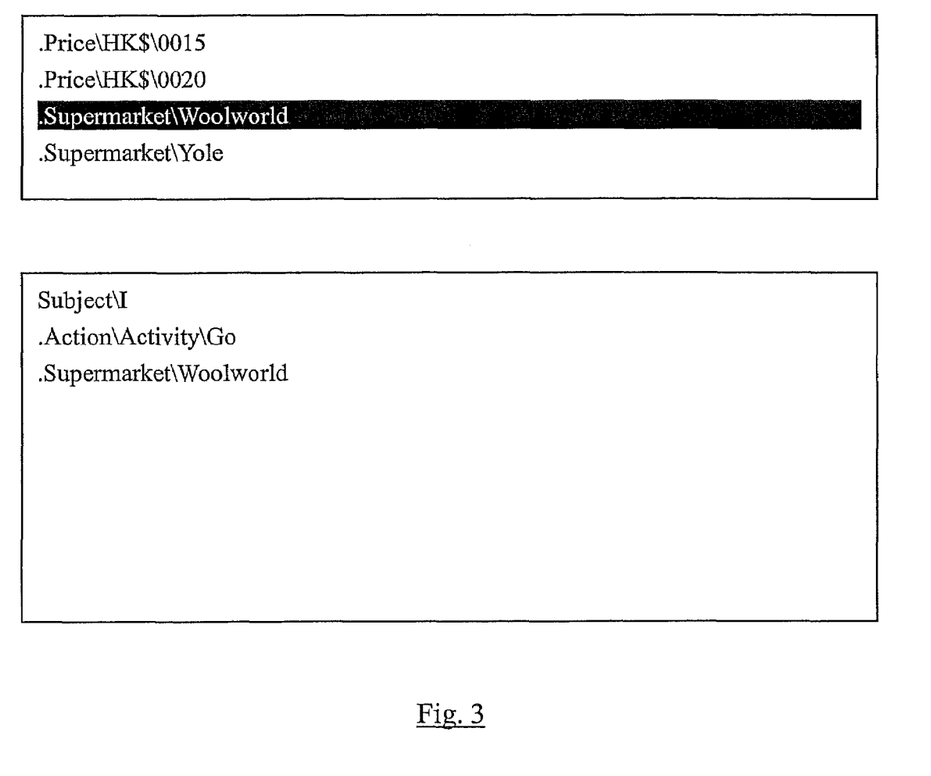
FIG. 3 shows a third display from the visual display unit in FIG. 1 during use of the method and program according to the present invention.

A further feature of the present invention is that it is possible to add new topic descriptors into the database as desired by the user. As discussed above, most people have a common stock of vocabulary. It is thus possible to provide a basic database which includes this common stock of vocabulary. The user is however allowed to expand on this basic database by including new words. If, therefore, there is a fourth supermarket called "Perfect Supermarket" not originally included in the basic database, as shown in FIG. 3, the user may include this supermarket in the database by typing in:

".Supermarket\Perfect"

This new entry will then be stored in this database in the computer, and will be shown next time when necessary for possible designation and choice.

Features are built into this method for enhancing the speed at which the text may be inputted into the data processing system, which, in practice, can closely match the speed of human speech. Firstly, all the words in the central database or library are indexed according to the conventional manner. Secondly, a hot key feature is included, whereby when the user types in the alphabet "b", the words beginning with the alphabet "b" will be shown in the upper window 12 in menu form. If the user then types in the alphabet "o", words beginning with the alphabets "bo-" will be shown in the upper window 12, and so on, until the user designates a certain word in the upper window 12.

Further, in order to ensure that the inputted text is appropriately categorized, dots (.) are used for signifying the level to which a certain descriptor refers. For example, in the following input:

Car

.Structure\Engine

. . . piston the word "structure" is one level below "car", and "engine" is also one level below "structure", thus the "." and the "\". However, as "piston" is a part of the engine, the word "piston" should also be one level below "engine". Thus, in order to ensure that the word "piston" refers to "engine", a double dot ".." precedes the word "piston", to signify that it is a sub-sub-level. Similarly, triple dots "..." and so on may be used.

By way of the combination of the above features, namely (a) the indexing of the words in the central database or library, (b) the hot key feature, and (c) the categorization of the words into a hierarchical structure, text can be inputted into the data processing apparatus, e.g. a computer, speedily. In addition, as all the text are inputted into the data processing apparatus in a relational format, i.e. in a manner which signifies its relationship with the text entered therebefore or thereafter, the computer is in a position to discern such interrelationship. Such an aggregate text may thus later be acted on by the computer for other purposes. To put it in more popular language, it can be said that the text is entered into the data processing apparatus in a "logicalised" manner, so that the apparatus is, by reason of the present invention, endowed with artificial intelligence (AI), in that it can "understand" the text entered into it, and to act on it later.

Figure 9A:
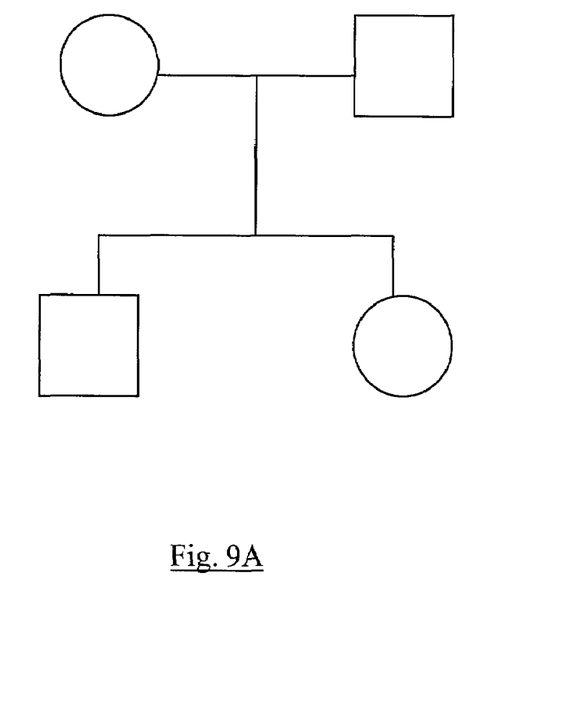
FIG. 9A shows a first family tree diagram which may be represented in text form according to the method of the present invention.

The method discussed above may also be used for providing a textual description of a graph. A family tree diagram is shown in FIG. 9A, graphically representing a pair of parents having two children, namely a son and a daughter. Using the above method, such may be represented in text as:

Children\Number\02

Child\01\Male

Chile\02\Female

Figure 9B:
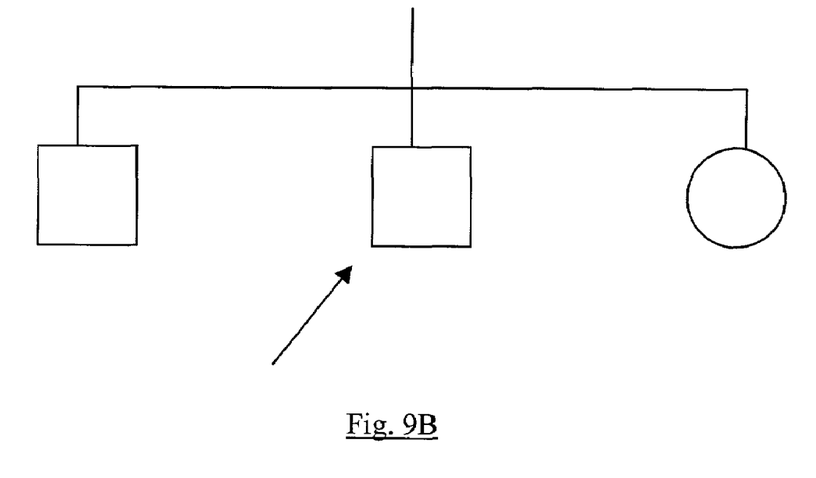
FIG. 9B shows a partial second family tree diagram which may be represented in text form according to the method of the present invention.

Such a method may be used for providing a textual description of the relation of a boy (marked by an arrow) with his elder brother and younger sister, as shown in the partial family tree diagram shown in FIG. 9B, as follows:

Sibling\Number\03

Sibling\Index\02

Sibling\01\Male

Sibling\03\Female

In this method and the relevant software, each of the topic descriptors is associated with a memo field, in which computer commands in text form may be inputted. The size of the memo field is practically indefinite, subject, of course, to the size of the memory of the computer. The computer language used for the commands may be FOXPRO, although other appropriate computer languages may also be used. The commands inputted into a memo field may be ones to direct the computer to display a certain topic descriptor/word in the lower window 14, if the topic descriptor/word is shown in the upper window 12 and chosen. It is also possible to associate a computer-generated event or command with the choice of a certain topic descriptor/word. For example, the memo field associated with the word "doorbell" may contain commands instructing the computer to generate and output a "Dong" sound, in which case choosing the word "doorbell" will cause a "Dong" sound to be outputted by the computer. This output of a "Dong" sound may replace, or be in addition to, the display of the word "doorbell" in the lower window 14. With this arrangement, it can be seen that there are virtually limitless ways in which the human user may interact with the computer. The choosing of a topic descriptor/word may bring about the occurrence of various events, subject only to the design of the user. This can be shown more clearly in FIG. 8.

Figure 8:
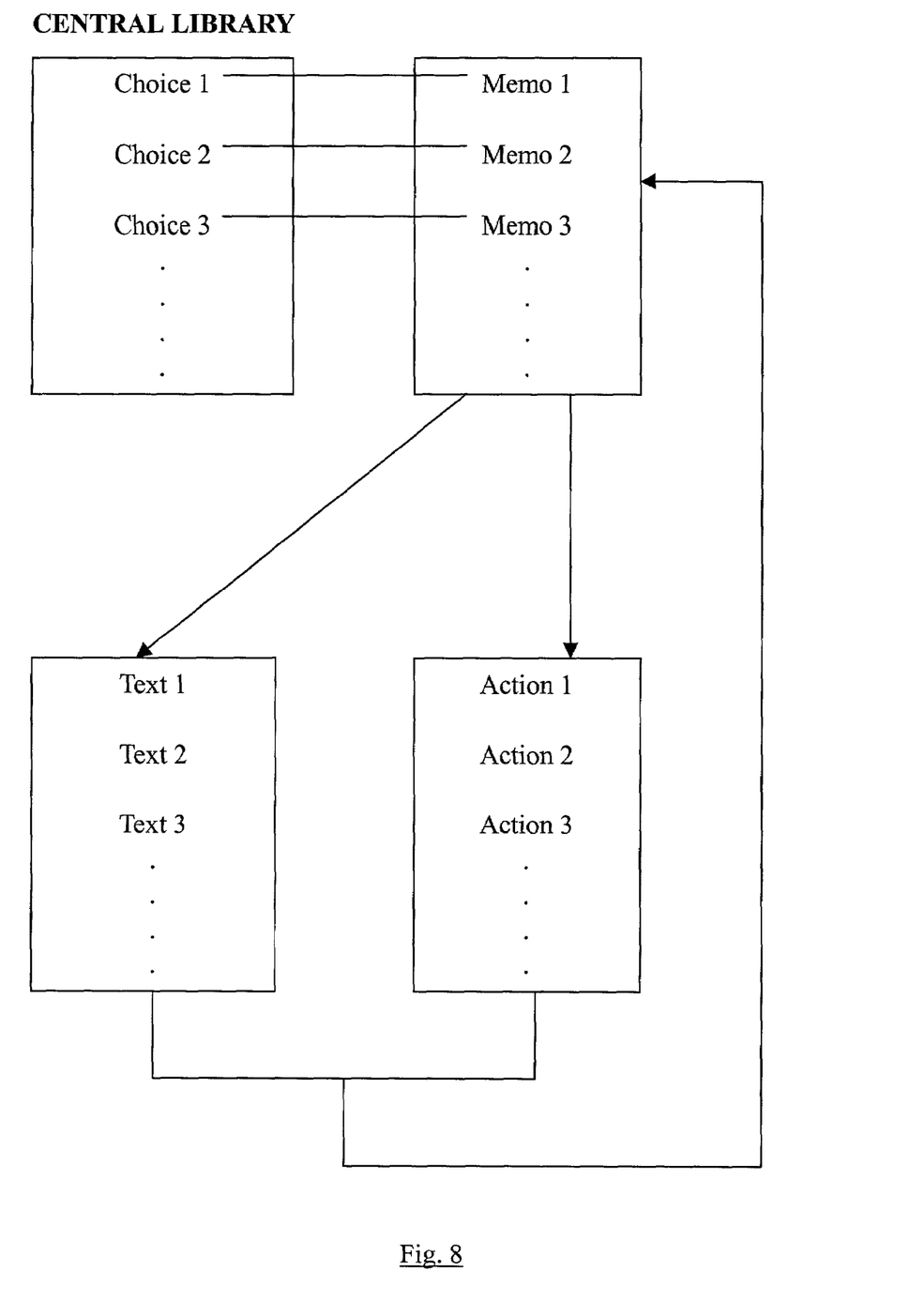
FIG. 8 shows schematically the relationship between a central library of the present invention and output mode thereof.

As shown in FIG. 8, each choice/word in the central database/library is associated with a respective memo field, indicated as "Memo" in FIG. 8, as discussed above. Take Choice 1 as an example, Memo 1 associated with it may contain computer commands to display Text 1 on the lower window 14 of the visual display unit of the data processing apparatus. As to Choice 2, Memo 2 associated with it may contain computer commands for another kind of output, e.g. Action 2, which is to play a video file stored in the data processing apparatus. As to Choice 3, Memo 3 associated with it may contain computer commands to both display the Text 3 on the lower window 14 and output a computer-generated event, Action 3. It can be seen that such allows a large variety of choices for the user. In addition, the aggregate output may also form a feedback to the relevant memo field(s) to bring about one or more further outputs.

It is found in practice that the above method is appropriate when used in the context of a question and answer dialogue, for example when a doctor seeing a patient. However, this method is not limited to this kind of context, and may indeed be used in more diverse situations.

It should be understood that the above only illustrates an example whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

What is claimed is:

1. A method of inputting text into a data processing apparatus, including the steps of:
   a. providing a database of words that are arranged hierarchically into plural categories based on a common characteristic, each category having a plurality of levels;
   b. advancing through the word hierarchy based on a sequence of keystrokes input by a user, the sequence of keystrokes being used to select a candidate word from the database;
   c. displaying, in a first window, plural lines of text associated with the sequence of keystrokes, wherein each line of text represents a relationship between the candidate word and a respective category provided in the database as the user advances through the hierarchy;
   d. iteratively selecting multiple lines of text from said plural lines of text shown in said first window based on the candidate word;
   e. displaying said selected multiple lines of text in a second window; and
   f. arranging the candidate words of each selected line of text into a sentence.

2. The method of claim 1 wherein said data processing apparatus comprises a personal computer.

3. The method of claim 1 wherein said data processing apparatus comprises a personal digital assistant.

4. The method of claim 1 wherein said database of words is provided in a memory of said data processing apparatus.

5. The method of claim 1 wherein said output in said step (e) includes an audio output.

6. The method of claim 1 wherein words comprising the selected lines of text are displayed in said second window in a relational manner.

7. The method of claim 1 further comprising:
   adding additional words into said database.

8. The method of claim 1 further comprising:
   allowing all occurrences of a word to be changed.

9. A data carrier medium containing a computer program configured and executable, when installed in a data processing apparatus, to
   (a) provide in said data processing apparatus a database of words that are arranged hierarchically into plural categories based on a common characteristic, each category having a plurality of levels,
   (b) advance through the word hierarchy based on keystrokes input by a user, the input keystrokes being used to select a candidate word from the database,
   (c) display, in a first window, plural lines of text, each line of text representing a relationship between the candidate word and a respective category provided in the database as the user advances through the word hierarchy,
   (d) iteratively select multiple lines of text from said plural lines of text displayed in said first window based on the candidate word;
   (e) display said selected multiple lines of text in a second window; and
   (f) arrange the candidate words of each selected line of text into a sentence.

10. The medium of claim 9 wherein said medium is an optically readable data disc.

11. The method of claim 1 wherein each line of text comprises plural words, each word representing a level in the word hierarchy and the words being separated by a "\" symbol.

12. The method of claim 1, further comprising:
   processing the multiple lines of text displayed in the second window based on interrelationships between the displayed words.

13. The method of claim 1, wherein the words are indexed in the database based on a common root feature.

14. The method of claim 1, wherein the common characteristic of words arranged hierarchically in the database includes at least one of a common significance and a common meaning of the words.

15. A method of inputting text into a data processing apparatus wherein words in a database are provided for current selection, the currently selected words being appended to a previously selected word whereby a sentence is formed, the method comprising the steps of:
   (a) arranging the words hierarchically in the database, based on a common characteristic, the hierarchical arrangement having plural categories wherein each category having a plurality of levels;
   (b) advancing through the word hierarchy based on a sequence of keystrokes input by a user, the sequence of keystrokes being used to select a candidate word from the database;
   (c) displaying, in a first window, plural lines of text associated with the sequence of keystrokes, wherein each line of text represents a relationship between the candidate word and a respective category provided in the database as the user advances through the hierarchy;

(d) iteratively selecting multiple lines of text from said plural lines of text shown in said first window based on the candidate word;
(e) displaying said selected multiple lines of text in a second window; and
(f) arranging the candidate words of each selected line of text into the sentence.

16. The method of claim 15 wherein said data processing apparatus comprises a personal computer.

17. The method of claim 15 wherein said data processing apparatus comprises a personal digital assistant.

18. The method of claim 15 wherein said database of words is provided in a memory of said data processing apparatus.

19. The method of claim 15 wherein said output in said step (e) includes an audio output.

20. The method of claim 15, further comprising:
processing the multiple lines of text displayed in the second window based on interrelationships between the displayed words.

21. The method of claim 15 wherein words comprising the selected lines of text are displayed in said second window in a relational manner.

22. The method of claim 15 further comprising:
adding additional words into said database.

23. The method of claim 15 further comprising:
allowing all occurrences of a word to be changed.

24. The method of claim 15 wherein each line of text comprises plural words, each word representing a level in the word hierarchy and the words being separated by a "\" symbol.

25. The method of claim 15, wherein the words are indexed in the database based on a common root feature.

26. The method of claim 15, wherein the common characteristic of words arranged hierarchically in the database includes at least one of a common significance and a common meaning of the words.

27. A data carrier medium containing computer program that when installed in a data processing apparatus, provides words for current selection that are appended to a previously selected word whereby a sentence is formed, the computer-readable medium be configured to:
(a) provide in said data processing apparatus a database of words that are arranged hierarchically into plural categories based on a common characteristic, each category having a plurality of levels;
(b) advance through the word hierarchy based on keystrokes input by a user, the input keystrokes being used to select a candidate word from the database;
(c) display, in a first window, plural lines of text, each line of text representing a relationship between the candidate word and a respective category provided in the database as the user advances through the hierarchy;
(d) iteratively select multiple lines of text from said plural lines of text shown in said first window based on the candidate word;
(e) display said selected multiple lines of text in a second window; and
(f) arrange the candidate words of each selected line of text into a sentence.

28. The medium of claim 27 wherein said medium is an optically readable data disc.

* * * * *